(12) United States Patent
Nada

(10) Patent No.: US 6,415,678 B1
(45) Date of Patent: Jul. 9, 2002

(54) WRIST MECHANISM OF INDUSTRIAL ROBOT

(75) Inventor: Minoru Nada, Shinminato (JP)

(73) Assignee: Nachi-Fujikoshi Corp., Toyama (JP)

( * ) Notice: Subject to any disclaimer, the term of this patent is extended or adjusted under 35 U.S.C. 154(b) by 92 days.

(21) Appl. No.: 09/631,677

(22) Filed: Aug. 3, 2000

(30) Foreign Application Priority Data

Aug. 3, 1999 (JP) .......................................... 11-220029

(51) Int. Cl.7 ................................................ B25J 17/00
(52) U.S. Cl. ..................................... 74/490.06; 901/29
(58) Field of Search ......................... 74/490.01, 490.05, 74/490.06; 901/15, 23, 25, 28, 29, 30

(56) References Cited

U.S. PATENT DOCUMENTS

| | | | |
|---|---|---|---|
| 4,690,012 A | * | 9/1987 | Dahlquist et al. ............. 74/479 |
| 5,279,177 A | * | 1/1994 | Inada ................... 74/479 BW |
| 5,549,016 A | | 8/1996 | Nakako et al. |
| 5,732,599 A | * | 3/1998 | Triyama .................. 74/490.02 |
| 5,761,965 A | * | 6/1998 | Dahlquist ................ 74/490.03 |
| 5,816,108 A | | 10/1998 | Obata et al. |
| 5,881,604 A | * | 3/1999 | Miwa ....................... 74/490.05 |
| 6,014,909 A | | 1/2000 | Fiora |
| 6,267,022 B1 | * | 7/2001 | Suzuki .................... 74/490.01 |

FOREIGN PATENT DOCUMENTS

JP 3-125055 * 5/1991

* cited by examiner

Primary Examiner—David Fenstermacher
(74) Attorney, Agent, or Firm—Venable; Robert J. Frank; Gabor J. Kelemen

(57) ABSTRACT

A wrist mechanism of an industrial robot is described which comprise first, second and third wrist elements rotatably supported relative to each other around respective rotation axes which are mutually inclined, which leaves a hollow space inside thereof free for passage of supply cables and pipes which are to be connected to a tool being secured to the robot wrist. The second and third wrist elements carries first and second ring-shaped hollow reduction units, and their respective output shafts rotates the second and third wrist elements, respectively, thereby the amounts of backlashes and flank wears in the transmitting gears as well as the amounts of reflected rotational movements of the second and third wrist elements affected by the rotational movements of the first and second wrist elements are reduced within fractions of the reduction ratios of each of the reduction units, which result the controllings of the positionings of the wrist elements become easy and accuracies thereof are increased.

2 Claims, 1 Drawing Sheet

WRIST MECHANISM OF INDUSTRIAL ROBOT

BACKGROUND OF THE INVENTION

1. Field of the Invention

The present invention relates to a wrist mechanism of an industrial robot comprising three wrist elements rotatably supported by an arm of the robot relative to each other around respective rotation axes which are mutually inclined, which leaves a hollow space inside thereof free for passage of supply cables and pipes which are to be connected to a tool being secured to the robot wrist.

2. Description of the Related Art

Such wrist mechanisms of the industrial robots each comprising two or three wrist elements which leaves a hollow space inside thereof free for passage of supply cables and pipes, are disclosed, for instance, in U.S. Pat. Nos. 5,549,016; 6,014,909 and 5,816,108. These patents include wrist mechanisms comprising hollow drive tubes and hollow bevel gears connected thereto to transmit rotational movements by the hollow drive tubes to each of the wrist elements and which leaves a hollow space inside thereof free for passage of supply cables and pipes.

In order to pass the supply cables and pipes inside the interiors of the robot wrist, usually chains of gears are used to transmit rotational movements by the hollow drive tubes to each of the wrist elements. Especially, in cases where chains of gears are used as the final input transmitting members to each of the wrist elements, a difficulty arises in that the controllings of the positionings of the wrist elements become unstable due to backlashes in the gears. Further, the positioning becomes more unstable due to flank wears of the gears suffering from high torques applied thereon. Another difficulty arises in that the controllings of the positionings of the wrist elements from a large amount of a reflected or followed rotational movement of the third wrist element caused by the rotational movements of the first and second wrist elements, that is, since the first, second and third hollow drive tubes are independently supported by the arm of the robot, and drive the first, second and third wrist elements relative to each other, a rotational movement of the first wrist element effects or follows those of the second and third wrist elements, as well as a rotational movement of the second wrist element effects or follows that of the third wrist element.

SUMMARY OF THE INVENTION

An object of the present invention is to provide a wrist mechanism of an industrial robot which has a sufficient hollow space inside thereof free for passage of supply cables and pipes which are to be connected to a tool being secured to the tool flange, wherein difficulties in that the controllings of the positionings of wrist elements become unstable due to backlashes and flank wears in the gears are eliminated and an accuracies of controllings thereof are increased.

Another object of the present invention is to provide a wrist mechanism of an industrial robot wherein amounts of reflected rotational movements of the second and/or third wrist elements affected by the rotational movements of the first and second wrist elements are made small, thereby the controllings of the positionings of the wrist elements become easy and an accuracies of controllings thereof are increased.

These and other objects are achieved by a wrist mechanism of an industrial robot comprising: first, second and third hollow drive tubes rotatably supported by an arm of the robot relative to each other coaxially around a first axis; a first wrist element supported by the first drive tube rotatably around the first axis; a first ring-shaped hollow reduction unit carried by the first wrist element, an input shaft of the first reduction unit being drivingly connected to the second drive tube via a first pair of bevel gears; a second wrist element supported by an output shaft of the first reduction unit rotatably around a second axis inclined with respect to the first axis; a second ring-shaped hollow reduction unit carried by the second wrist element, an input shaft of the second reduction unit being drivingly connected to the third drive tube via second and third pairs of bevel gears, the second and third pairs of bevel gears being connected by a tubular drive shaft; and, a third wrist element or tool flange carried by an output shaft of the second reduction unit rotatably around a third axis inclined with respect to the second axis; said third drive tube, the tubular drive shaft and the second reduction unit leaving a sufficient hollow space inside thereof free for passage of supply cables and pipes which are to be connected to a tool being secured to the tool flange.

By such an arrangements, by using ring-shaped hollow reduction units in the wrist mechanism, a sufficient hollow space is secured inside thereof free for passage of supply cables and pipes which are to be connected to a tool being secured to the tool flange. Further, since the amount of backlashes and flank wears in the gears are reduced within a fractions of the reduction ratios of each of the reduction units, the difficulties in that the controllings of the positionings of the wrist elements become unstable due to backlash and flank wears in the gears are eliminated and an accuracies of controllings thereof are increased. Similarly, since amounts of reflected rotational movements of the second and/or third wrist elements affected by the rotational movements of the first and second wrist elements are reduced within fractions of the reduction ratios of each of the reduction units, they resulted that the amounts of the reflected rotational movements are made so small, thereby the controllings of the positionings of the wrist elements become easy and an accuracies of controllings thereof are increased.

DETAILED DESCRIPTION OF THE PREFERRED EMBODIMENTS

Figure 1:
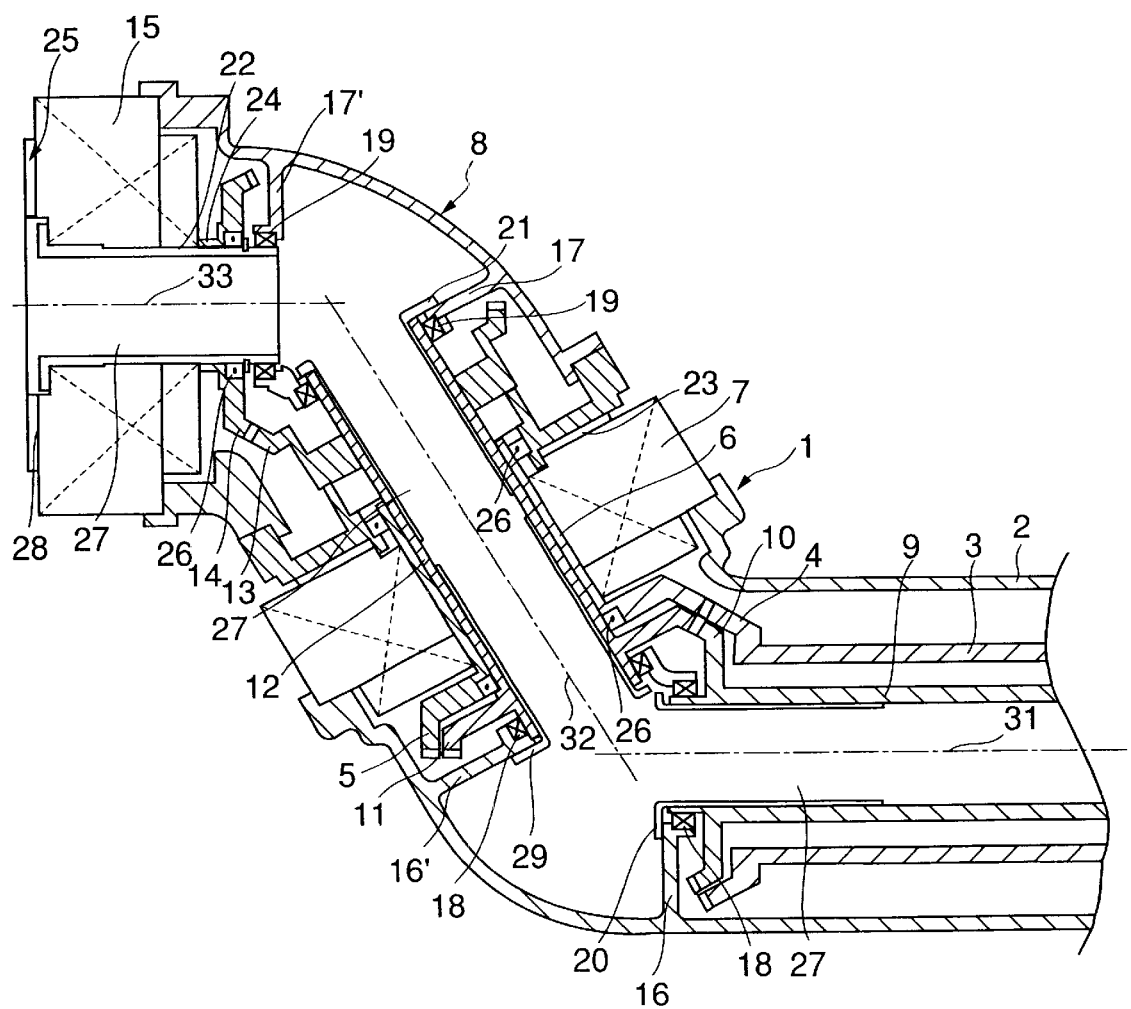
FIG. 1 is a side cross-sectional view showing an embodiment of a wrist mechanism of an industrial robot of the present invention.

This invention will now be described with reference to FIG. 1, in which a preferred embodiment of a wrist mechanism of an industrial robot of the invention is described, by way of example, having first, second and third hollow drive tubes 2, 3, 9 rotatably supported by an arm of the robot, not shown either, relative to each other coaxially around a first axis 31. The first drive tube 2 supports a first wrist element 1 rotatably around the first axis 31. The first wrist element 1 carries a first ring-shaped hollow reduction unit 7. An input shaft 6 of the first reduction unit 7 is drivingly connected to the second drive tube 3 via a first pair of bevel gears 4, 5. An output shaft 23 of the first reduction unit 7 supports a second wrist element 8 rotatably around a second axis 32 inclined with respect to the first axis 31. The second wrist element 8 carries a second ring-shaped hollow reduction unit 15. An input shaft 24 of the second reduction unit 15 is drivingly connected to the third drive tube 9 via second and third pairs of bevel gears 10, 11 and 13, 14. A tubular drive shaft 12 connects the bevel gears 11 and 13. A third wrist element or tool flange 25 is supported by an output shaft 28 of the second reduction unit 15 rotatably around a third axis 33 inclined with respect to the second axis 32. The third drive tube 9, the tubular drive shaft 28 and the second reduction unit 15 leave a sufficient hollow space 27 inside thereof free for passage of supply cables and pipes, not shown either, which are to be connected to a tool, not shown, to be secured to the tool flange 25.

In operation, the first drive tubes 2 forming a part of the robot arm, not shown, is connected at one end to a third reduction unit driven by a motor, not shown either, and the other end is connected to the first wrist element 1, and rotates the entire wrist mechanism. The second drive tubes 3 arranged coaxially with the first drive tubes 2 around the first axis 1 is connected at one end to a motor via gears, not shown, and the other end is secured to the bevel gear 4. The bevel gear 4 meshes with the bevel gear 5 which is secured to the input shaft 6 of the first reduction unit 7, and rotates the second wrist element 8 supported by the output shaft 23 of the first reduction unit 7. The third drive tubes 9 arranged coaxially with the second drive tubes 3 around the first axis 1 is connected at one end to a motor via gears, not shown, and the other end is secured to the bevel gear 10. The bevel gear 10 meshes with the bevel gear 11 which is secured to the tubular drive shaft 12 rotatably supported by an interior of the first reduction unit 7 via bearings 26, and rotates the second wrist element 8 carried by the output shaft 23 of the first reduction unit 7 around the second axis 32 inclined with respect to the first axis 31. The bevel gear 13 is secured at the distal end of the tubular drive shaft 12. The bevel gear 13 meshes with the bevel gear 14 which is secured to the input shaft 24 of the second reduction unit 15, and rotates the second reduction unit 15, thereby rotates the third wrist element or the tool flange 25 carried by the output shaft 28 of the second reduction unit 15 around the third axis 33 inclined with respect to the second axis 32.

A rotational movement of the first wrist element 1 by the first drive tube 2 follows those of the first, second and third pairs of bevel gears 4, 5, 10, 11, 13, 14 which result those of the second and third wrist elements 8, 15. At the same time, a rotational movement of the second wrist element 8 by the second drive tube 3 reflects or follows those of the second and third pairs of bevel gears 10, 11 and 13, 14 which result that of the third wrist element 15. In order to reduce the amounts of these reflected or followed rotational movements of the second and third wrist elements 8, 15 caused by the first drive tube 2, adjustments of meshing relations between bevel gears 4, 5, 10, 11, 13, 14 are performed by changing each numbers of paired gears. In the wrist mechanism of the present invention, since the amounts of reflected rotational movements of the third wrist element 25 affected by the rotational movements of the first and second wrist elements 1, 8 are reduced within fractions of the reduction ratios of each of the reduction units 7, 15, resulting that the meshing relations thereof to be adjusted are made so small, thereby the controllings of the positionings of the wrist elements become easy.

Similarly, in order to reduce the amount of the reflected rotational movement of the input shaft 24 of the second reduction unit 15 by the first drive tube 2, similarly, adjustments of meshing relations between bevel gears 13, 14 are performed, however, the amount of the reflected rotational movement thereof is reduced within a fraction of the reduction ratio of the second reduction unit 15, it results that the meshing relations thereof to be adjusted are made so small, thereby the controlling of the positioning of the wrist elements becomes easy.

Preferably, partitions 16, 16' and seals 18, 18 are formed and fitted between the interior of the third drive tube 9 and the first and second pairs of bevel gears 4, 5 and 10, 11, and similarly, partitions 17,17' and seals 19, 19 are fitted between the interior of the tubular drive shaft 12 and the third pair of the bevel gears 13, 14 so that the hollow space 27 inside of the interiors thereof is free from leakage of lubricant oil or grease supplied on the bevel gears 4, 5, 10, 11, 13, 14 onto the supply cables and pipes, not shown, passing through the hollow space 27.

More preferably, protective guard covers 20, 29, 22 are attached on each of the interiors of the third drive tube 9, the tubular drive shaft 12 and the second reduction unit 15, respectively, so that the supply cables and pipes, not shown, passing through the hollow space 27 do not interfere with the third drive tube 9, the tubular drive shaft 12 and the second reduction unit 15.

What is claimed is:

1. A wrist mechanism of an industrial robot comprising:
   first, second and third hollow drive tubes rotatably supported by an arm of the robot relative to each other coaxially around a first axis,
   a first wrist element supported by the first drive tube rotatably around the first axis,
   a first ring-shaped hollow reduction unit carried by the first wrist element, an input shaft of the first reduction unit being drivingly connected to the second drive tube via a first pair of bevel gears,
   a second wrist element supported by an output shaft of the first reduction unit rotatably around a second axis inclined with respect to the first axis,
   a second ring-shaped hollow reduction unit carried by the second wrist element, an input shaft of the second reduction unit being drivingly connected to the third drive tube via second and third pairs of bevel gears, the second and third pairs of bevel gears being connected by a tubular drive shaft,
   a third wrist element or tool flange carried by an output shaft of the second reduction unit rotatably around a third axis inclined with respect to the second axis,
   said third drive tube, the tubular drive shaft and the second reduction unit leaving a free hollow space inside thereof, and
   partitions and seals formed and fitted between an interior of the third drive tube and the first pairs of bevel gears, between an interior of the tubular drive shaft and the second and third pairs of bevel gears, and between an interior of the second reduction unit and the third pairs of bevel gears, respectively, so that the hollow space is free from leakage of lubricant oil or grease supplied on the bevel gears.

2. The wrist mechanism of the industrial robot claimed in claim 1, wherein a protective guard cover is attached on each interior of the third drive tube, the tubular drive shaft and the second reduction unit, respectively.

* * * * *